United States Patent
Del Pozo Polidoro et al.

(10) Patent No.: US 8,845,104 B2
(45) Date of Patent: Sep. 30, 2014

(54) SOLAR TRACKER HAVING OLEO-HYDRAULIC CYLINDERS AND METHOD FOR OPERATING SAME

(75) Inventors: Enrique Del Pozo Polidoro, Seville (ES); Juan Enrile Medina, Seville (ES)

(73) Assignee: Abengoa Solar New Technologies, S.A., Sevilla (ES)

( * ) Notice: Subject to any disclaimer, the term of this patent is extended or adjusted under 35 U.S.C. 154(b) by 14 days.

(21) Appl. No.: 13/805,878

(22) PCT Filed: Jun. 21, 2011

(86) PCT No.: PCT/ES2011/000207
§ 371 (c)(1),
(2), (4) Date: Feb. 7, 2013

(87) PCT Pub. No.: WO2011/161280
PCT Pub. Date: Dec. 29, 2011

(65) Prior Publication Data
US 2013/0146046 A1 Jun. 13, 2013

(30) Foreign Application Priority Data
Jun. 22, 2010 (ES) .................................. 201000817

(51) Int. Cl.
*G03B 21/00* (2006.01)
*F24J 2/54* (2006.01)
*F24J 2/52* (2006.01)

(52) U.S. Cl.
CPC .... *F24J 2/52* (2013.01); *F24J 2/54* (2013.01); *Y02E 10/47* (2013.01); *F24J 2002/5441* (2013.01)
USPC ............... 353/3; 353/119; 353/122; 126/569; 126/572; 126/573

(58) Field of Classification Search
CPC ................... F24J 2/14; F24J 2/38; F24J 2/52; F24J 2002/5437; F24J 2002/5441; F24J 2/07; F24J 2/5424; Y02E 10/45; Y02E 10/47
USPC .............. 353/3, 119, 122; 359/853, 854, 855, 359/856, 861; 126/572, 569, 573, 574, 600, 126/601, 602
See application file for complete search history.

(56) References Cited

U.S. PATENT DOCUMENTS 4,178,913 A 12/1979 Hutchison
4,306,540 A * 12/1981 Hutchison ..................... 126/607
(Continued)

FOREIGN PATENT DOCUMENTS

DE 20 2000 012 317 U1 11/2007
ES 2 322 527 6/2009
(Continued)

*Primary Examiner* — Sultan Chowdhury
(74) *Attorney, Agent, or Firm* — Hamre, Schumann, Mueller & Larson, P.C.

(57) ABSTRACT

The invention relates to a solar tracker having oleo-hydraulic cylinders that increase the rigidity of the system by keeping the two chambers of each cylinder pressurized, even while on stand-by. This makes the system more accurate, avoiding undesirable cylinder movement caused by oil compression. The system includes a circuit having at least one cylinder assembly (8,9), an oleo-hydraulic plant and a control system (5), wherein the oleo-hydraulic plant supplies the oil to the cylinders controlling the speed of movement of these latter, and the control system (5) supervises and controls the correct operation of the entire system and protects said system against possible accidents.

7 Claims, 1 Drawing Sheet

(56) References Cited

U.S. PATENT DOCUMENTS

| | | | |
|---|---|---|---|
| 5,253,637 A * | 10/1993 | Maiden | 126/696 |
| 6,123,067 A | 9/2000 | Warrick | |
| 6,363,928 B1 * | 4/2002 | Anderson, Jr. | 126/577 |
| 2010/0059045 A1 * | 3/2010 | Guinea Diaz et al. | 126/601 |
| 2010/0095955 A1 * | 4/2010 | Carrasco Martinez | 126/601 |
| 2010/0282315 A1 * | 11/2010 | Gilbert | 136/259 |
| 2011/0079214 A1 * | 4/2011 | Hon | 126/573 |
| 2011/0232631 A1 * | 9/2011 | Bohmer | 126/606 |

FOREIGN PATENT DOCUMENTS

| | | |
|---|---|---|
| ES | 2 329 854 | 12/2009 |
| FR | 2 468 857 | 5/1981 |
| WO | WO 2008/096029 | 8/2008 |

\* cited by examiner

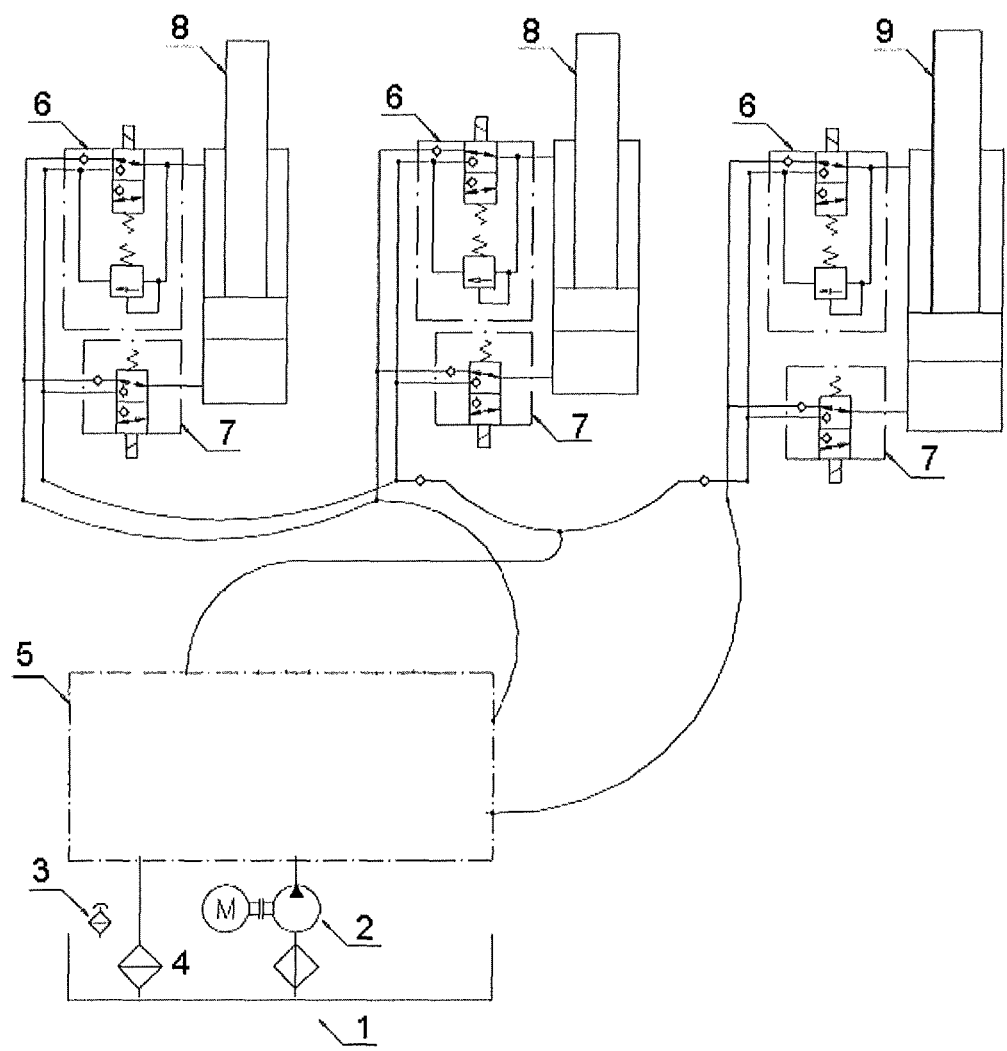

SOLAR TRACKER HAVING OLEO-HYDRAULIC CYLINDERS AND METHOD FOR OPERATING SAME

TECHNICAL FIELD OF THE INVENTION

The invention falls within the sector of solar energy, more specifically, it relates to the technology of solar trackers, whether for cylindrical-parabolic collectors, parabolic dishes, heliostats or photovoltaic modules, to achieve a continuous and precise orientation towards the sun.

BACKGROUND OF THE INVENTION

The generation of energy from solar radiation is an industry in continuous development. There are a great number of solar receiver typologies, but all of them are based on a fundamental premise: the greater the solar radiation captured, the greater the amount of energy produced.

There are two main types of technologies: solar thermal and photovoltaic. The solar thermal is based on the concept of the concentration of solar radiation to produce vapor or hot air, which can subsequently be used in conventional electric power plants. Photovoltaic technology is based on the photoelectric effect for the production of electricity.

Within the solar thermal technology, there are two large groups of concentrators: point focus and linear. Within the point focus concentrators are parabolic dish concentrators and central tower concentrators, the latter surrounded by heliostats that concentrate the solar light on them. Within the linear technology, the Parabolic Cylinder Concentrator (PCC) is the most developed concentration system and currently new Linear Fresnel Collector (FLC) types are beginning to emerge, which also use mirrors to reflect the solar light.

The majority of these systems, whether parabolic dish concentrators, heliostats, cylindrical parabolic collectors or photovoltaic modules, use a tracker system that allows them to remain permanently oriented towards the sun, thus increasing the amount of energy produced.

The solar trackers, in the majority of cases, perform both azimuthal and zenithal tracking and are operated thanks to oleo-hydraulic cylinder circuits.

There are a great number of documents that describe diverse developments of this type of trackers, such as the patents ES2329854, ES2322527, W02008/096029 . . .

This type of operation poses a serious problem: the oil is not an incompressible fluid. This leads to light movements being produced, which, although for the majority of industrial applications, do not pose a problem to take into consideration, in the case of solar concentration, is the cause of a significant decrease in the efficiency of the systems.

The change of volume with respect to the initial volume that the oil experiences upon a change of pressure is known as compressibility constant. In mineral oils, the value of this constant is approximately 1.5 GPa, reducing the volume of around 0.7% for every 100 bars of pressure.

$$K = -\frac{\Delta P}{\left(\frac{\Delta V}{V}\right)} \text{ (At constant temperature)}$$

This constant also depends on the initial pressure and temperature of the oil, increasing its value the greater the initial pressure and the lower the temperature.

Moreover, in cylinders, and in terms of absolute values, the volume of oil can be compressed less the lesser the diameter of the cylinder and thereby its volume.

In trackers, the changes in volume of oil are due to the action of external forces such as the wind and the weight of the tracker itself.

All of this means that in cylinders of 883 mm in length, such as those used in certain trackers, the movement produced as a consequence of the compression is of 6 mm.

In the case of cylinders that regulate the orientation towards the sun such as those used in solar technology, a loss of precision implies a considerable reduction in the efficiency of the system. A deviation in the movement of around 6 mm can bring about losses of up to 100% in a given case.

A possible solution consists in using systems that externally stop the cylinder (rod brakes), if these systems present the limitation that, not being designed for a lot of movement maneuvers, the cylinders are damaged after frequent and prolonged usage. In the case of solar trackers the application is quite different, since it requires a great amount of brake usage maneuvers. Caliper brakes can also be used, but this solution implies a high cost which does not compensate for the efficiency gain.

Therefore, the present invention has the objective of providing a solution to the problem of precision loss due to the compression of oil, achieving an increase in the rigidity of the system without implying a considerable increase in costs.

DESCRIPTION OF THE INVENTION

The invention describes a system of oleo-hydraulic cylinders for the operation of solar trackers. Thanks to a previous pressurization of the cylinders, an increase in the rigidity of the system is achieved and therefore, the precision loss caused by the compression of the oil is drastically reduced.

The claimed system is valid for trackers that perform their movement in one or more shafts as well as for systems that use one or more cylinders.

Currently, for ordinary hydraulic applications, the movement originates upon applying a pressure of 80 bars, for example, to one of the chambers of the cylinder and the other chamber is connected to tank (0 bars). The difference of pressure between the chambers is what produces, through the circulation of the oil, the movement of the piston. As one of the chambers is at 0 bars (tank pressure), the cylinder acts as though the rigidity of the entire system were provided by the chamber at 80 bars therefore, the precision of the assembly would depend on the pressure of this chamber, which in turn, depending on the position of the piston in the cylinder (which gives us the volume of this chamber), the pressure of the oil is determined. This compression will be greater the more volume of oil we have in this chamber.

This compression translates to a loss of precision of the tracker system.

On some occasions this effect of loss of precision can be reduced compensating the deviations through the control system of the solar tracker. For example, as the heliostat varies its position in elevation and the center of gravity is displaced, a traction or compression of the cylinder is produced, with the consequent loss of precision. Thanks to the slow movement of the tracker, it is possible to identify the difference between the real position and the theoretical position by mean of a position sensor. Once said error has been identified, the difference can be corrected by recalculating the new position. In the case that loads are applied occasionally, for example those due to gusts of wind, it is very difficult to compensate for the error produced due to the response time that the hydraulic systems have.

Furthermore, it should be noted that these types of trackers are continuously moving (around three times per minute), therefore the corrections must be continuous. This solution, therefore, does not prevent the problem from arising, although correction of the consequences thereof, are achieved.

The system of the invention, unlike the known state of the art, proposes a solution that prevents the problem from arising or at least, minimizes it to technically acceptable values.

The precision of the trackers is strongly dependent on the compressibility constant. This precision increases when the compressibility constant of the oil increases. As mentioned in the previous section, the compressibility constant increases if the initial pressure at which the oil is subjected increases, thus a pressurization of the cylinders will cause an increase of precision in the tracker. Thanks to a previous pressurization of the cylinders, an increase in the rigidity of the system is achieved and hence, the loss of precision caused by the compression of the oil is drastically reduced.

This new application is based on cylinders whose two chambers are subjected to a pressure of, for example 100 bars, when the tracker is on stand-by instead of remaining unpressurized as in the previous case.

This way, when the system attempts to move and a pressure is applied, following the previous example of 80 bars on the piston, said pressure is distributed between the two chambers, in such a way that one of the chambers will have a pressure of 140 bars and the other will reduce its pressure to a pressure of 60 bars (since the 80 bars are distributed between both chambers). Given that both chambers are under a pressure, the precision of the assembly is due to the sum of compressibility of both chambers, achieving an increase in precision, at worst, doubled compared to the previous system.

The final pressure depends on factors such as the difference in surfaces due to the surface of the rod and the position of the piston.

The influence of the position of the piston is not trivial either. As mentioned in the previous paragraphs, the precision of a pressurized hydraulic cylinder depends on the sum of the compressibility of the two chambers that comprise it and this compressibility depends on the amount of oil that we have in each chamber and therefore the position of the piston inside the cylinder, that determines the volume of the oil in each chamber.

In this way, if the piston is at the halfway point, that is, in the middle of the cylinder, we can consider that there is the same amount of oil in the two chambers (something which is not completely true because the area of the piston for one of the chambers is slightly greater than for the other chamber, but this is a difference that does not influence this reasoning). Therefore, we can consider that the precision of the cylinder and thus the precision of the tracker is due to the sum of the compressibility of the two chambers that are equal, and in this case, this precision is approximately double that of ordinary applications.

When the piston is in one of its end positions the precision increases by more than double because it controls the precision of the chamber containing the least volume upon summing the compressibility of both.

Therefore, we will always have a greater precision or equal to the double of pressure that we had in the cases of normal hydraulic applications.

This solution of previous pressurization of the chambers achieves to increase the rigidity of the system and reduces the loss of precision caused by the compression of the oil to a point at which it no longer affects the efficiency of the system.

In order to carry it out, the modifications to be made in the current systems are few and imply a practically negligible increase in cost compared to the cost of the assembly, as the thickness of the walls of the cylinders would need to be increased to withstand the greater pressure in the chambers (instead of 80 bars, they would have to withstand 140 bars) and only one of the joins would have to be replaced, which, sometimes are even so oversized, that they are not affected by the increase in pressure.

Therefore, with this system a minimization of movements of the tracker is achieved, to a point at which the efficiency in production of energy does not suffer substantial reduction and without substantially increasing the cost of the final system.

DESCRIPTION OF THE DRAWINGS

In order to complete the description being made and with the object of facilitating a better comprehension of the invention, below are a set of drawings where with a representative but not limitative character, the following is shown:

FIG. 1: Oleo-hydraulic circuit of a solar tracker, according to the invention.

The references that appear in the figures correspond to the following elements:
1. Tank
2. Motor pump
3. Filler cap
4. Return filter
5. Control system
6. Thermal expansion pressure limitation block
7. Cylinder block without pressure limitation
8. Stroke cylinder 883 mm
9. Stroke cylinder 582 mm

PREFERRED EMBODIMENT OF THE INVENTION

In order to achieve a better understanding of the invention, below is a description of an exemplary embodiment of a solar tracker circuit with oleo-hydraulic cylinders, according to a preferred embodiment.

FIG. 1 shows an exemplary embodiment of an oleo-hydraulic circuit that controls a photovoltaic panel solar tracker.

In the case of preferred embodiment, there is a tracker that controls both the azimuthal as well as the zenithal movement.

The circuit comprises the cylinder assemblies (8, 9) which move the tracker (in the preferred embodiment there would be three), an oleo-hydraulic plant and a control system (5).

Two of the cylinders (8) that will have a greater stroke length, specifically 883 mm in the case of the preferred embodiment described, will be responsible for performing the azimuthal movement. The third cylinder or elevator (9), with a lesser stroke length, in the preferred embodiment of 582 mm, will be responsible for the zenithal or elevation movement.

The oleo-hydraulic plant controls the speed of the movement of the cylinders, at the same time supplying the oil required for their movement. This plant comprises: a tank (1) where the oil of the cylinders (8, 9) is stored, with a filler cap (3) and a return filter (4) to prevent impurities from entering into the tank (1) when the oil returns from the cylinders (8, 9). There is also a motor pump (2) that will be responsible for sending the oil to said cylinders (8, 9).

The control system (5) is formed by a number of elements such as: pressure limiters, directional valves, accumulators, pressure switches, sensors . . . and monitors and controls the correct operation of the entire system and protects it against possible accidents.

The operation of the system would be as follows:

The motor pump (2) is responsible for maintaining a pressure in the accumulator which is located inside the control system (5), The pressure of the accumulator is transmitted to both chambers of the three cylinders (8, 9), thus achieving a constant pressurization of the chambers prior to movement.

When it is necessary to carry out a movement, the chamber of the cylinder that will reduce its volume is connected to the tank (1). In this way, upon oil leaving the chamber, a movement is produced when oil enters the opposite chamber.

Once this movement is performed, the chamber of the corresponding cylinder (8, 9) is connected once again with the pressure of the accumulator, thus obtaining the initial pressurization.

This system is specially designed for its use in solar trackers, but its use is not excluded for other fields of the industry that require similar characteristics.

The invention claimed is:

1. A solar tracker with oleo-hydraulic cylinders for movements in one or more shafts, a circuit of the solar tracker comprising:
   at least one cylinder assembly; and
   an oleo-hydraulic plant with an accumulator and a control system,
   wherein the cylinder assembly includes a piston that divides an interior of two chambers, wherein the two chambers of the cylinder assembly are maintained constantly pressurized by transmission of pressure from the accumulator to the two chambers, even when the solar tracker is on stand-by, and
   the oleo-hydraulic plant includes a tank where an oil for the cylinder assembly is stored, a filler cap, a return filter, and a motor pump that sends the oil to said cylinder assembly.

2. The solar tracker with oleo-hydraulic cylinders according to claim 1, wherein the oleo-hydraulic plant supplies the oil to the cylinder assemblies, controlling the speed of movement of the cylinder assemblies.

3. A solar tracker with oleo-hydraulic cylinders for movements in one or more shafts, a circuit of the solar tracker comprising:
   three cylinder assemblies; and
   an oleo-hydraulic plant with an accumulator and a control system,
   wherein each of the three cylinder assemblies includes a piston that divides an interior of two chambers, wherein the two chambers of the each of the three cylinder assemblies are maintained constantly pressurized by transmission of pressure from the accumulator to the two chambers, even when the solar tracker is on stand-by, and
   the two of the three cylinder assemblies are configured to be responsible for carrying out an azimuthal movement and each of said two of the three cylinder assemblies has a greater stroke length than a stroke length of the third of the three cylinder assemblies.

4. The solar tracker with oleo-hydraulic cylinders according to claim 3, wherein the stroke length of each of the two of the three cylinder assemblies is 883 mm.

5. The solar tracker with oleo-hydraulic cylinders according to claim 3, wherein the third of the three cylinder assemblies with a lesser stroke length is configured to be responsible for the elevation movement.

6. The solar tracker with oleo-hydraulic cylinders according to claim 5, wherein the stroke length of the third of the three cylinder assemblies is 582 mm.

7. A method of operation of the solar tracker with oleo-hydraulic cylinders, the method comprising the following stages: a motor pump maintaining a pressure in an accumulator which is located inside a control system; a pressure of the accumulator being transmitted to all of chambers of all of the oleo-hydraulic cylinders, wherein each of the oleo-hydraulic cylinders includes two chambers divided by a piston, achieving an initial pressurization for all of the chambers prior to movement; when it is necessary to carry out a movement, one of the two chambers of one of the oleo-hydraulic cylinders reduces its volume, and is connected to a tank which can store an oil for the oleo-hydraulic cylinders; in this way, upon oil leaving the one of the two chambers, a movement is produced when the oil enters an opposite one of the two chambers of one of the oleo-hydraulic cylinders chamber; and once this movement is performed, the opposite one of the two chambers of the one of the oleo-hydraulic cylinders is connected once again with the pressure of the accumulator, thus obtaining the initial pressurization.

* * * * *